US009695999B2

(12) United States Patent
Takenaka et al.

(10) Patent No.: US 9,695,999 B2
(45) Date of Patent: Jul. 4, 2017

(54) LIGHTING SYSTEM FOR VEHICLE

(71) Applicant: HONDA MOTOR CO., LTD., Tokyo (JP)

(72) Inventors: Nobuyuki Takenaka, Wako (JP); Hiroshi Hayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 260 days.

(21) Appl. No.: 14/245,112

(22) Filed: Apr. 4, 2014

(65) Prior Publication Data

US 2014/0321138 A1 Oct. 30, 2014

(30) Foreign Application Priority Data

Apr. 24, 2013 (JP) .................. 2013-091716

(51) Int. Cl.
*F21S 8/10* (2006.01)
*B60Q 1/00* (2006.01)
*B60Q 1/068* (2006.01)

(52) U.S. Cl.
CPC ........ *F21S 48/1241* (2013.01); *B60Q 1/0041* (2013.01); *B60Q 1/0088* (2013.01); *B60Q 1/0094* (2013.01); *B60Q 1/0683* (2013.01); *F21S 48/1104* (2013.01); *F21S 48/1159* (2013.01); *F21S 48/1305* (2013.01);
(Continued)

(58) Field of Classification Search
CPC ............... F21S 48/1104; F21S 48/1159; F21S 48/1305; F21S 48/155; F21S 48/211; F21S 48/215; F21S 48/2206; F21S 48/225; F21S 48/2268; F21S 48/2287; F21S 48/255; F21S 48/328; F21S 48/1241; B60Q 1/0094; B60Q 1/0683
See application file for complete search history.

(56) References Cited

U.S. PATENT DOCUMENTS

2007/0047249 A1* 3/2007 Kogo .................. B60Q 1/0011
362/538
2009/0154186 A1* 6/2009 Natsume ............. B60Q 1/0041
362/516
(Continued)

FOREIGN PATENT DOCUMENTS

DE 103 14 645 A1 11/2004
DE 102006007134 A1 8/2007
(Continued)

*Primary Examiner* — Jong-Suk (James) Lee
*Assistant Examiner* — Christopher E Dunay
(74) *Attorney, Agent, or Firm* — Westerman, Hattori, Daniels & Adrian, LLP

(57) ABSTRACT

In a lighting system for a vehicle provided with a main light, an extension arranged between a reflector of the main light and an outer lens, a light guide member located in the vicinity of the extension, and a light source for the light guide member provided separately from a light source for the main light, the light source and a driver for the light guide member are arranged effectively to improve external appearance. A light incident section provided in the light guide member for admitting light from the light source for the light guide member, and a driver for the light guide member for adjusting power supply amount to the light source for the light guide member, are arranged in such a position as to be covered with an extension in a front view.

16 Claims, 10 Drawing Sheets

(52) U.S. Cl.
CPC ........... *F21S 48/155* (2013.01); *F21S 48/211* (2013.01); *F21S 48/215* (2013.01); *F21S 48/225* (2013.01); *F21S 48/2206* (2013.01); *F21S 48/2268* (2013.01); *F21S 48/2287* (2013.01); *F21S 48/255* (2013.01); *F21S 48/328* (2013.01)

(56) References Cited

U.S. PATENT DOCUMENTS

| | | | |
|---|---|---|---|
| 2009/0231866 A1* | 9/2009 | Yamamura | B60Q 1/085 362/466 |
| 2009/0296417 A1* | 12/2009 | Luo | F21K 9/00 362/487 |
| 2010/0053987 A1* | 3/2010 | Nakabayashi | F21S 48/1154 362/538 |
| 2011/0032721 A1 | 2/2011 | Koizumi et al. | |
| 2011/0063863 A1 | 3/2011 | Hotei et al. | |
| 2011/0310610 A1* | 12/2011 | Brown | F21S 48/1241 362/253 |
| 2012/0069592 A1 | 3/2012 | Natsume et al. | |
| 2012/0134167 A1* | 5/2012 | Huang | B60Q 1/0041 362/519 |
| 2013/0196525 A1* | 8/2013 | Takamatsu | B60Q 1/0094 439/232 |

FOREIGN PATENT DOCUMENTS

| | | |
|---|---|---|
| DE | 10 2009 010 510 A1 | 10/2009 |
| EP | 1 048 893 A2 | 11/2000 |
| EP | 2194311 A2 | 6/2010 |
| EP | 2 327 585 A1 | 6/2011 |
| JP | 61-171107 A | 8/1986 |
| JP | 2011-065839 A | 3/2011 |
| WO | 2012/096406 A1 | 7/2012 |
| WO | 2013/022027 A1 | 2/2013 |

* cited by examiner

LIGHTING SYSTEM FOR VEHICLE

CROSS-REFERENCE TO RELATED APPLICATIONS

The present application claims priority under 35 U.S.C. §119 to Japanese Patent Application No. 2013-091716, filed Apr. 2, 2013, the contents of which is incorporated herein, by reference, in its entirety.

TECHNICAL FIELD

The present invention relates to a lighting system for a vehicle provided with a main light, an extension arranged between a reflector of the main light and an outer lens, and a light guide member located in the vicinity of the extension.

BACKGROUND OF THE INVENTION

The lighting system for the vehicle is disclosed in Japanese Patent Laid-open Publication No. 2011-65839, etc.

SUMMARY OF THE INVENTION

In the device disclosed in Japanese Patent Laid-open Publication No. 2011-65839, light from a light source for the main light is incident upon a light guide member. However, when employing such construction, the degree of freedom with respect to the arrangement of the light guide member is decreased. Therefore, it is conceivable that a light source for the exclusive use of the light guide member is provided separately from the light source for the main light. In this case, it is required the light source for the light guide member and a driver for the light guide member for adjusting the power supply amount to the light source for the light guide member are effectively arranged without injuring the external appearance.

A lighting system for the vehicle is provided that is capable of arranging the light source for the light guide member and the driver for the light guide member without injuring the external appearance in the case where the light source for the exclusive use of the light guide member is used separately from the light source for the main light.

According to a first feature, there is provided a lighting system for a vehicle comprising a main light, an extension arranged between a reflector for the main light and an outer lens, and a light guide member located in the vicinity of the extension, wherein a light source for the light guide member is provided separately from a light source for the main light provided in the main light, and wherein a light incident section of the light guide member for admitting light from the light source for the light guide member and a driver for the light guide member for adjusting power supply amount to the light source for the light guide member are arranged in such a position as to be covered by the extension in a front view.

According to a second feature, in addition to the first feature, the light guide member is fixedly attached to the extension, and the light source for the light guide member is fixedly attached to at least one of the extension and the light guide member.

According to a third feature, in addition to the second feature, the driver for the light guide member is fixedly supported on at least one of the extension and the light guide member in such a position as to be covered by the extension in a front view.

According to a fourth feature, in addition to the third feature, the light source for the light guide member and the driver for the light guide member are provided on a common base plate, wherein the base plate is fixedly supported on at least one of the extension and the light guide member.

According to a fifth feature, in addition to the fourth feature, the base plate is configured to extend vertically and is arranged on an outer side in the vehicle width direction of the main light, wherein the light source for the light guide member and the driver for the light guide member are attached to the base plate in a state of being aligned with each other in the upward and downward direction.

According to a sixth feature, in addition to the fifth feature, the light guide member is configured to extend in the upward and downward direction such that an upper end of the light guide member is arranged more outwardly, in the vehicle width direction, than a lower end thereof, wherein the light incident section is located on the side of the upper end of the light guide member and the driver for the light guide member is arranged below the light source for the light guide member.

According to a seventh feature, in addition to any one of the fourth through sixth features, there is provided a lead wire being led into the housing from a back wall of the housing in order for supplying electric power to the driver for the light guide member, wherein the lead wire is formed with a curved portion bulging forwardly in front of the back wall and is connected to the base plate, and a regulation plate section is provided at an outer end portion in the vehicle width direction of the extension so as to regulate inward displacement in the vehicle width direction of the curved portion, within the housing.

Further, according to an eighth feature, in addition to the seventh feature, there is provided an adjustment support section which allows the reflector to be supported in the housing in such a manner as to make it possible to adjust an optical axis of the main light, wherein the curved portion and the adjustment support section are arranged side by side in the vehicle width direction and in close vicinity to each other, and the regulation plate section is located between the curved portion and the adjustment support section in the vehicle width direction.

By the way, a headlight device in the embodiment corresponds to a lighting system. A high beam headlight and a low beam headlight in the embodiment correspond to the main light. A light source for the high beam headlight and a light source for the low beam headlight in the embodiment correspond to the light source for the main light, and a support spindle in the embodiment corresponds to the adjustment support section.

According to the first feature, the light incident section of the light guide member for admitting light from the light source for the light guide member which is provided separately from the light source for the main light, and the driver for the light guide member for adjusting power supply amount to the light source for the light guide member, are arranged in such a position as to be covered with the extension in a front view. With this construction, it is possible to arrange effectively the light incident section and the driver for the light guide member without injuring the external appearance.

According to the second feature, since the light source for the light guide member is fixedly attached to at least one of the extension and the light guide member which is fixedly supported on the extension, the irregularity in the relative position between the light incident section and the light guide member can be controlled.

According to the third feature, since the driver for the light guide member is fixedly supported on at least one of the extension and the light guide member in such a position as to be covered with the extension in a front view, the property of external appearance can be increased in such a manner that the driver for the light guide member is invisible from outside.

According to the fourth feature, since the base plate on which the light source for the light guide member and the driver for the light guide member are commonly provided, is fixedly supported on at least one of the extension and the light guide member, the light source for the light guide member and the driver for the light guide member can be assembled without increasing component parts, whereby to permit cost reduction. In addition, it is possible to simplify the assembling of the light source for the light guide member and the driver for the light guide member.

According to the fifth feature, the base plate is configured to extend vertically and arranged on the outer side in the vehicle width direction of the main light, and the light source of the light guide member and the driver for the light guide member are attached to the base plate in a state of being aligned with each other in the upward and downward direction. With this construction, the width of the base plate in the vehicle width direction can be decreased, so that the width of the lighting system can be decreased.

According to the sixth feature, the light guide member is configured to extend in the upward and downward direction such that the upper end of the light guide member is arranged more outwardly in the vehicle width direction than the lower end thereof, and the light incident section is located on the side of the upper end of the light guide member while the driver for the light guide member is arranged below the light source for the light guide member. With this construction, the light source for the light guide member and the driver for the light guide member can be easily arranged on the base plate.

According to the seventh feature, the lead wire for supplying electric power to the driver for the light guide member is led into the housing from the back wall of the housing so as to be connected to the base plate, and is formed with the curved portion bulging forwardly in front of the back wall. Therefore, the lead wire has enough length, so that when the extension or the light guide member on which the base plate is attached is assembled into the housing, the assembling operation can be easily performed. Moreover, since the regulation plate section provided at the outer end portion in the vehicle width direction of the extension is adapted to regulate the inward displacement in the vehicle width direction of the curved portion, within the housing, it is possible to control the inward displacement of the lead wire in the vehicle width direction.

Further, according to the eighth feature, the adjustment support section is provided to allow the reflector to be supported in the housing in such a manner as to adjust the optical axis of the main light. The curved portion and the adjustment support section are arranged side by side in the vehicle width direction and in close vicinity to each other, and the regulation plate section is located between the curved portion and adjustment support section in the vehicle width direction. Therefore, the interference between the adjustment support section and the curved portion is prevented and the adjustment support section is arranged as outwardly in the vehicle width direction as possible, so that the reflector can be supported in a stable fashion.

BRIEF DESCRIPTION OF THE DRAWINGS

The advantages of the invention will become apparent in the following description taken in conjunction with the drawings, wherein.

DETAILED DESCRIPTION OF THE INVENTION

An embodiment will be explained with reference to the attached drawings. In the following description, the orientation such as "front", "rear", "left", "right", "upper" and "lower" is indicated with reference to a driver riding on a two-wheeled motorcycle.

Figure 1:
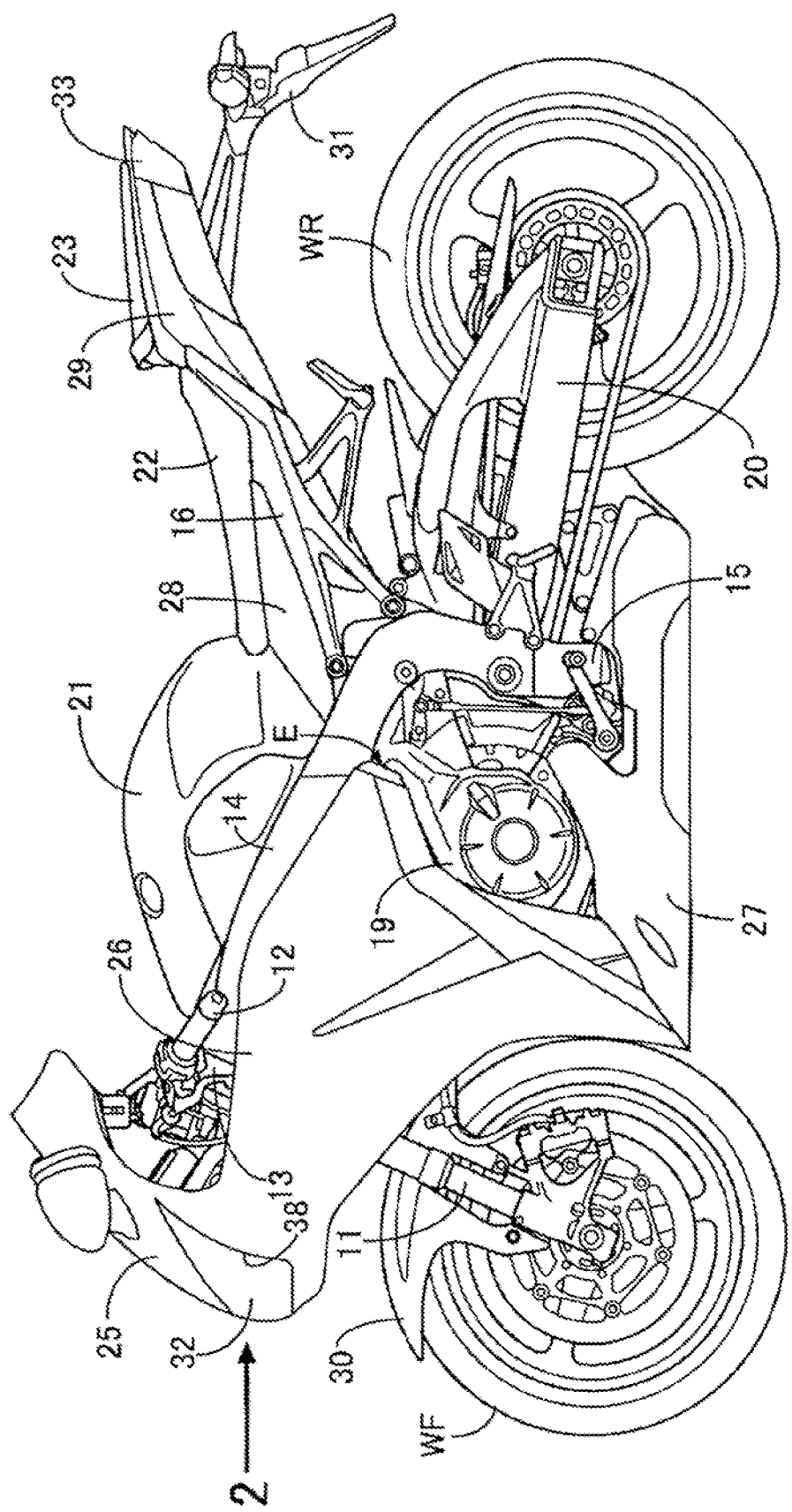
FIG. 1 is a side view of a two-wheeled motorcycle.

Referring first to FIG. 1, a vehicle body frame F of a two-wheeled motorcycle of a straddle type vehicle includes a pair of front forks 11 pivotally carrying a front wheel WF, a head pipe 13 supporting a steering handle 12 in a steerable fashion which is connected to the front forks 11, a pair of left and right main frames 14 extending from the head pipe 13 downwardly to the rear, a pair of left and right pivot frames 15 being connected integral with rear portions of the main frames 14 and extending in the downward direction, a pair of left and right seat rails 16 extending from the rear portions of the main frames 14 upwardly to the rear, etc.

On the vehicle body frame F, there is carried an engine body 19, for example, of a water cooled internal combustion engine E which is arranged under the main frames 14. In addition, a swing arm 20 is pivotally mounted at a front end thereof on the pivot frames 15 in an upwardly and downwardly swingable fashion. A rear wheel WR which is driven by motive power of the internal combustion engine E is pivotally carried on a rear end of the swing arm 20.

A fuel tank 21 is mounted on the main frames 14 above the internal combustion engine E. A front riding seat 23 which is disposed in the rear of the fuel tank 21 and a rear riding seat 23 which is disposed in the rear of the front riding seat 22 are supported by the seat rails 16.

A front cowling 25 is located directly above the front wheel WF and supported by the vehicle body frame F. The head pipe 13 located in a front end portion of the vehicle body frame F is covered with the front cowling 25 from the forward direction. A pair of left and right center cowlings 26 for covering the front portion of the vehicle body frame F and a portion of the internal combustion engine E from each of lateral directions is connected to left and right sides of the front cowling 25. A pair of left and right lower cowlings 27 which covers a lower part of the internal combustion engine E from the lateral sides and the lower side thereof and which is joined to each other is connected continuously to rear lower portions of the center cowlings 26, respectively. In addition, a pair of left and right side covers 28 for covering a rear lower part of the fuel tank 21 from each of the lateral sides is arranged between the fuel tank 21 and the front riding seat 22. A part of each of the seat rails 16 located below the rear riding seat 23 is covered with a rear cowling 29.

Moreover, on the front forks 11 there is supported a front fender 30 for covering at least a portion of the front wheel WF from above, while on the rear portions of the seat rails 16 there is supported a rear fender 31 for covering the rear wheel WR from a rear upper side.

A headlight device 32 in accordance with the present invention is arranged in a front center position of the front cowling 26, while a tail light device 33 is arranged in a center position of a rear end of the rear cowling 29.

Figure 2:
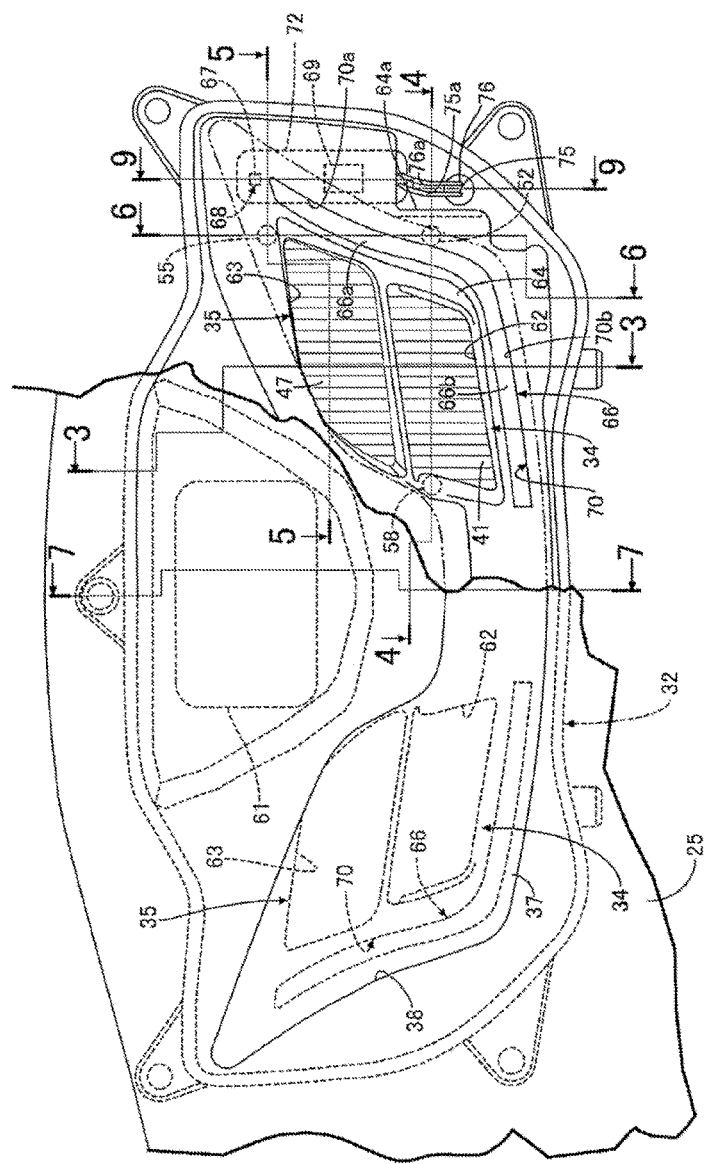
FIG. 2 is a partially cutaway front view of a headlight device taken in the direction of an arrow 2 of FIG. 1.
Figure 3:
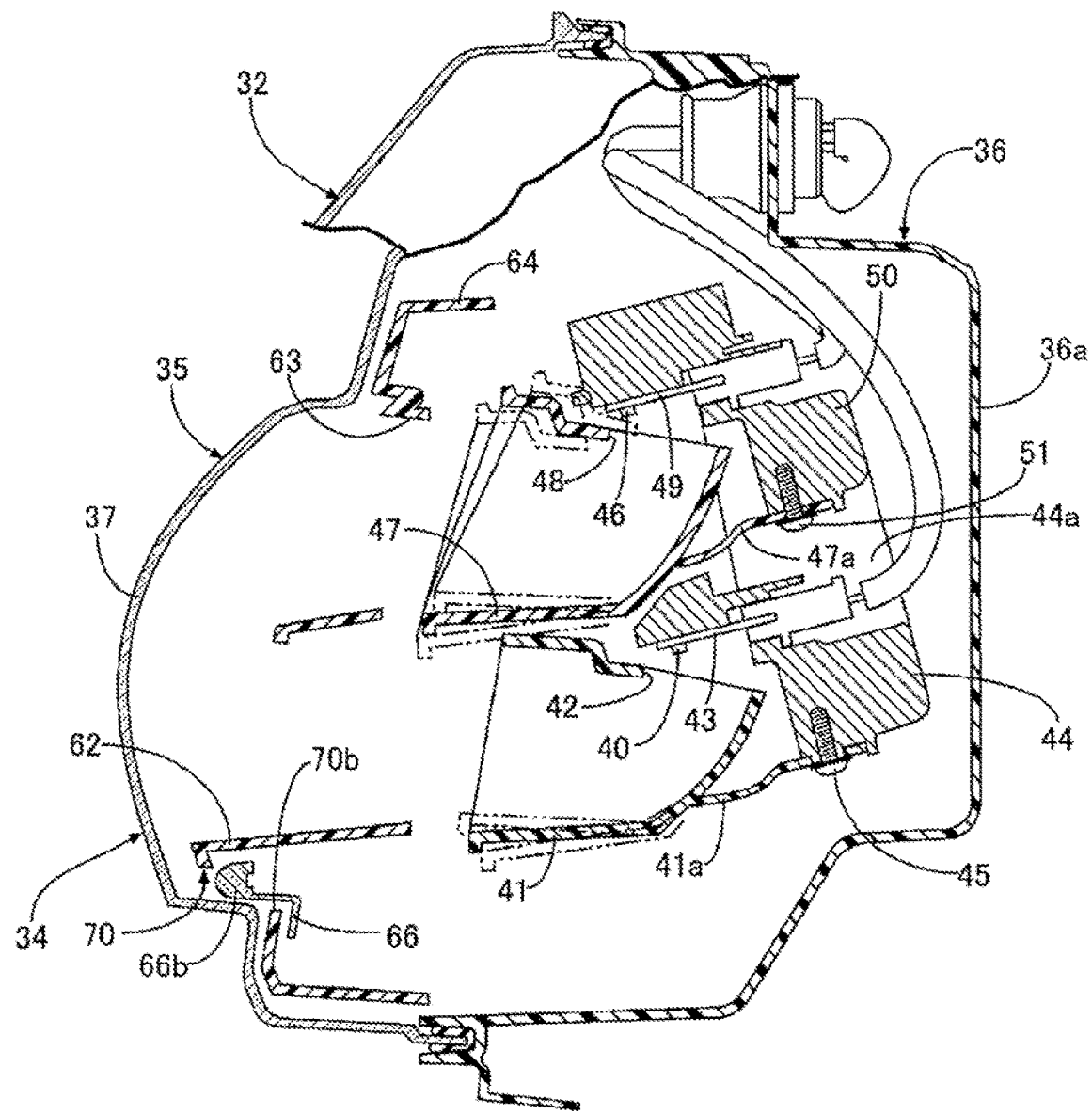
FIG. 3 is a cross sectional view taken on line 3-3 of FIG. 2.

Referring to FIGS. 2 and 3 together, a main light of the headlight device 32 includes a pair of left and right high beam headlights 34, and a pair of left and right low beam headlights 35 arranged above these high beam headlights 34. The high beam headlights 34 and the low beam headlights 35 have in common a single housing 36 and a single lens 37 which is attached to the housing 36 from the forward direction with a portion facing into an opening portion 38 provided in the front cowling 25.

The high beam headlight 34 includes the housing 36, the lens 37, a light source 40 for the high beam headlight 34, and a reflector 41 for the high beam headlight 34 for reflecting light from the light source 40 for the high beam headlight 34 in the forward direction. The light source 40 for the high beam headlight 34 is, for example, an LED.

In a rear upper part of the reflector 41 for the high beam headlight 34 there is provided an aperture 42 for irradiating the light from the light source 40 for the high beam headlight 34 provided above the reflector 41 for the high beam head light 34, toward an inside of the reflector 41 for the high beam headlight 34. The light source 40 for the high beam headlight 34 is attached on a base plate 43 for the high beam headlight 34 in such a way as to irradiate the light toward the aperture 42 of the reflector 41 for the high beam headlight 34.

The low beam headlight 35 includes the housing 36, the lens 37, a light source 46 for the low beam headlight 35, and a reflector 47 for the low beam headlight 35 for reflecting light from the light source 46 for the low beam headlight 35 in the forward direction. The light source 46 for the low beam headlight 35 is, for example, an LED.

In a rear upper part of the reflector 47 for the low beam headlight 35 there is provided an aperture 48 for irradiating the light from the light source 46 for the low beam headlight 35 provided above the reflector 47 for the low beam head light 35, toward an inside of the reflector 47 for the low beam headlight 35. The light source 46 for the low beam headlight 35 is attached on a base plate 49 for the low beam headlight 35 in such a way as to irradiate the light toward the aperture 48 of the reflector 47 for the low beam headlight 35.

Figure 4:
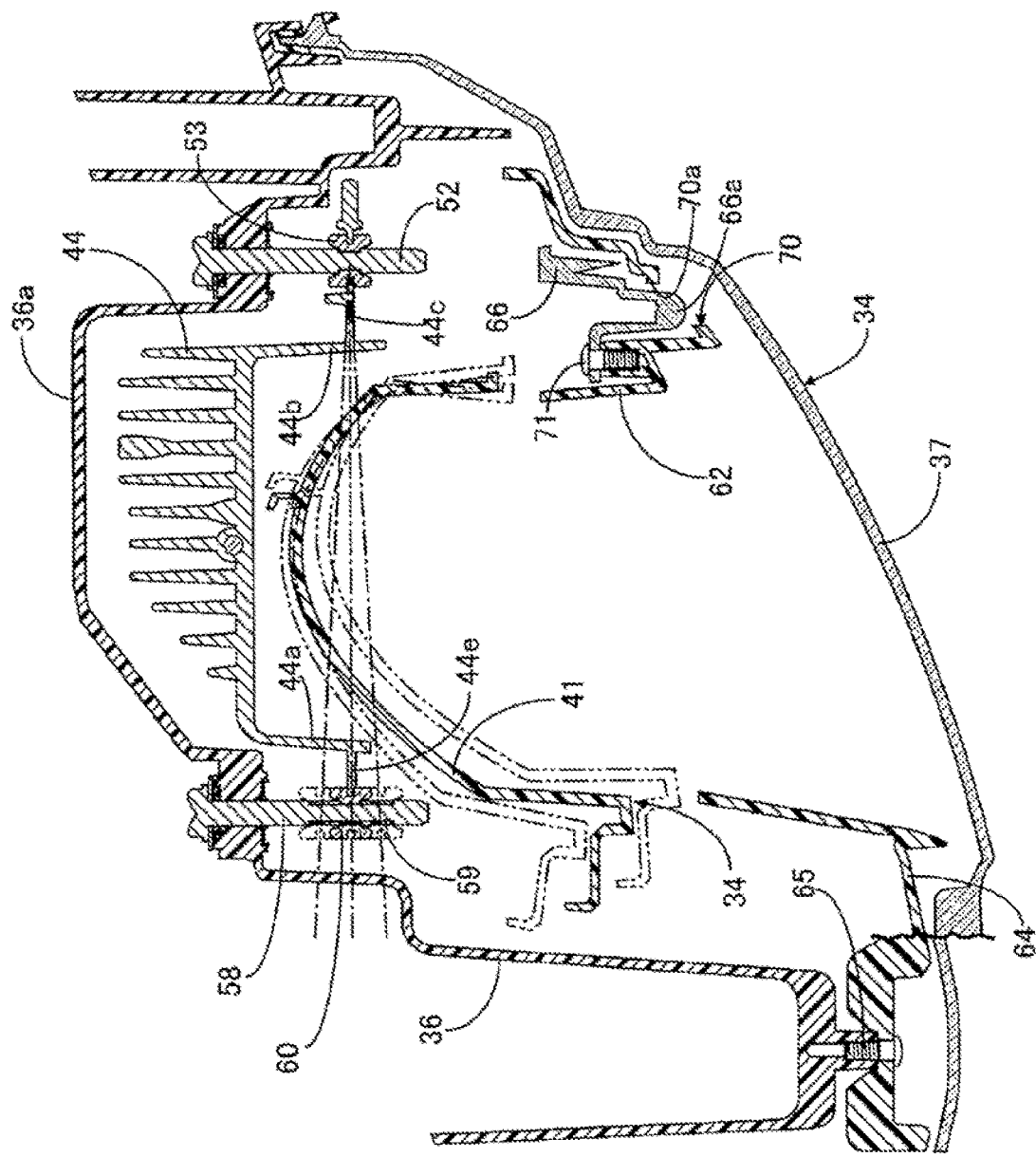
FIG. 4 is a cross sectional view taken on line 4-4 of FIG. 2.

Referring to FIG. 4 together, in the rear of the reflector 41 for the high beam headlight 34 there is provided a heat sink 44 for the high beam headlight 34 which is fastened to a support arm portion 41a formed integrally with the reflector 41 for the high beam headlight 34, by a screw member 45 (see FIG. 3). The base plate 43 for the high beam headlight 34 is attached to the heat sink 44 for the high beam headlight 34.

Figure 5:
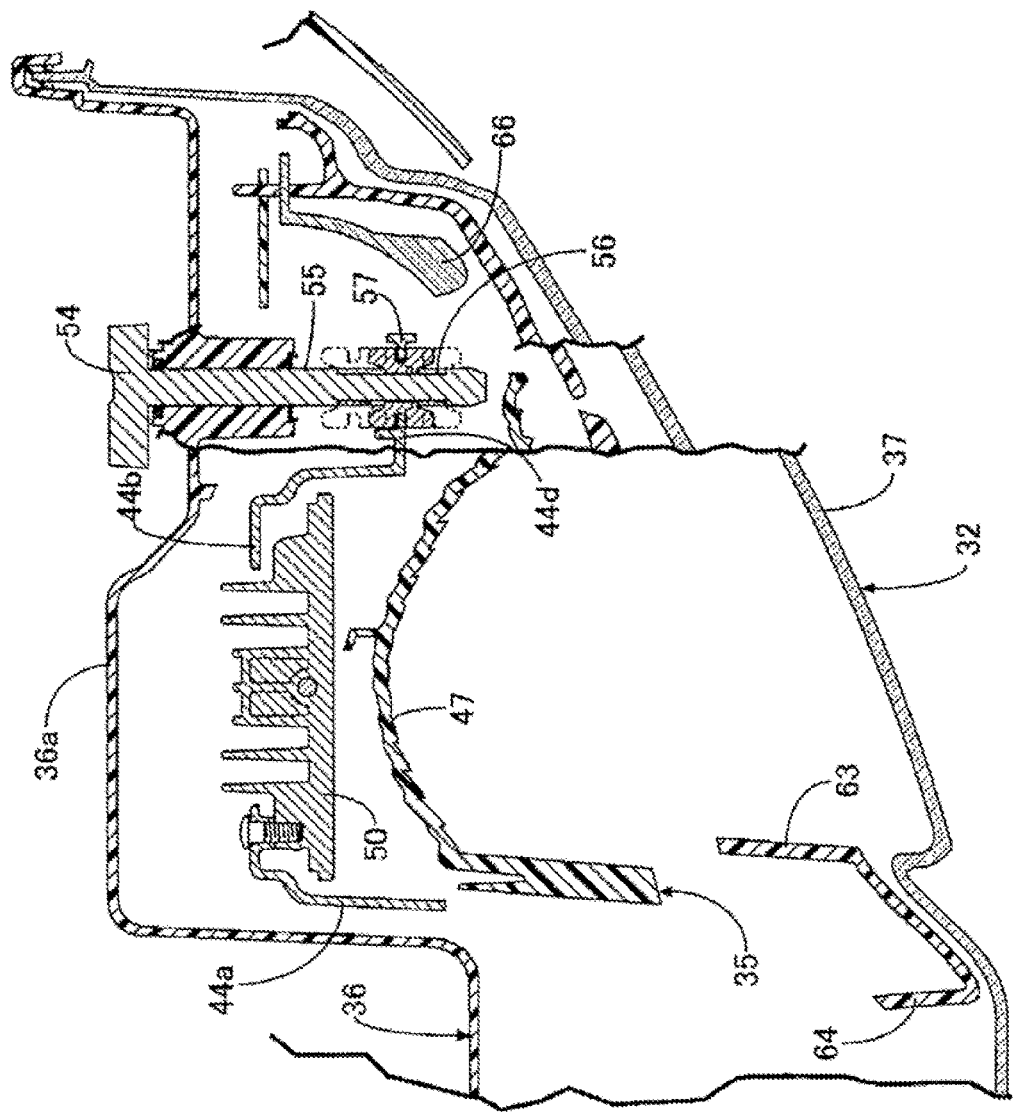
FIG. 5 is a cross sectional view taken on line 5-5 of FIG. 2.

Referring to FIG. 5 together, in the rear of the reflector 47 for the low beam headlight 35, there is provided a heat sink 50 for the low beam headlight 35 which is fastened to a support arm portion 47a formed integrally with the reflector 47 for the low beam headlight 35, by a screw member 51 (see FIG. 3). The base plate 49 for the low beam headlight 35 is attached to the heat sink 50 for the low beam headlight 35.

Moreover, a pair of upwardly extending connecting arm portions 44a, 44b is integrally provided on each end in the vehicle width direction of the heat sink 44 for the high beam headlight 34. The heat sink 50 for the low beam headlight 34 is fastened to these connecting arm portions 44a, 44b. Namely, the heat sink 44 for the high beam headlight 34 and the heat sink 50 for the low beam headlight 35 located above the high beam headlight 34 are connected to each other in a uniform relative positional relationship.

Figure 6:
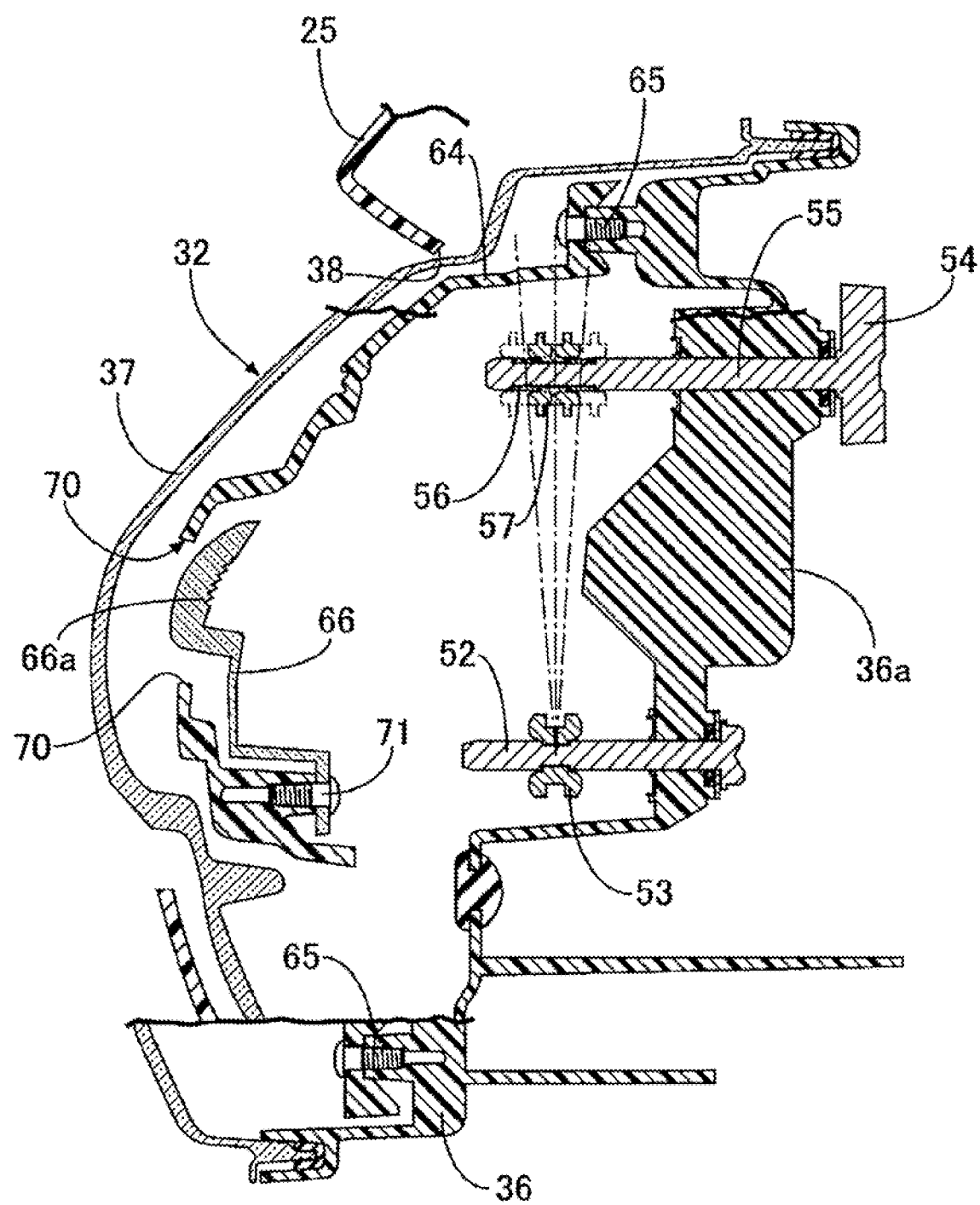
FIG. 6 is a cross sectional view taken on line 6-6 of FIG. 2.

Referring further to FIG. 4 and FIG. 6, a support arm 44c which extends outwardly in the vehicle width direction is integrally provided on a lower part of the connecting arm portion 44b located on an outer side in the vehicle width direction, of the pair of connecting arm portions 44a, 44b of the heat sink 44 for the high beam headlight 34. On the other hand, on an outer lower part in the vehicle width direction of a back wall 36a of the housing 36, there is provided a support spindle 52 which extends in the forward and backward direction of the vehicle and passes fluid-tightly through the back wall 36a. A distal end of the support arm portion 44c is swingably supported in a nut 53 which is screwed on the support spindle 52.

Further, an arm portion 44d which extends outwardly in the vehicle width direction is integrally provided on an upper part of the connecting arm 44b located on the outer side in the vehicle width direction, of the pair of connecting arms 44a, 44b of the heat sink 44 for the high beam headlight 34. On the other hand, a rotation spindle 55 which is integrally provided at an outer end thereof with a knob 54 and which extends in parallel with the support spindle 52 is supported in a rotatable fashion on an outer upper part in the vehicle width direction of the back wall 36a of the housing 36 and passes fluid-tightly through the back wall 36a. A distal end of the arm portion 44d is connected to a nut 57 which is engaged on a male screw 56 formed on an outer periphery of the rotation spindle 55.

When the rotation spindle 55 is rotated by the knob 54, the nut 57 moves in the direction along an axis of the rotation spindle 55, so that, as seen in FIGS. 3 and 6, the high beam headlight 34 and the low beam headlight 35 swing or rock on the nut 57 as a fulcrum. In this way, the optical axes of the high beam headlight 34 and the low beam headlight 35 can be adjusted in the upward and downward direction.

Referring to FIG. 4, an arm 44e which extends inwardly in the vehicle width direction is provided in a lower part of the connecting arm portion 44a located inwardly in the vehicle width direction, of the pair of arm portions 44a, 44b of the heat sink 44 for the high beam headlight 34. On the other hand, a bolt 58 which extends in parallel with the support spindle 52 and passes fluid-tightly through the back wall 36a is supported in a rotatable fashion on an inner lower part in the vehicle width direction of the back wall 36a of the housing 36. A distal end of the arm portion 44e is connected to a nut 60 which is engaged on a male screw 59 provided on the bolt 58.

When the bolt 58 is rotated, the nut 59 moves in the direction along an axis of the bolt 58, so that, as shown by a chain line in FIG. 4, the high beam headlight 34 and the low beam headlight 35 swing or rock on the nut 57 as a fulcrum. In this way, the optical axes of the high beam headlight 34 and the low beam headlight 35 can be adjusted in the left and right direction.

Figure 7:
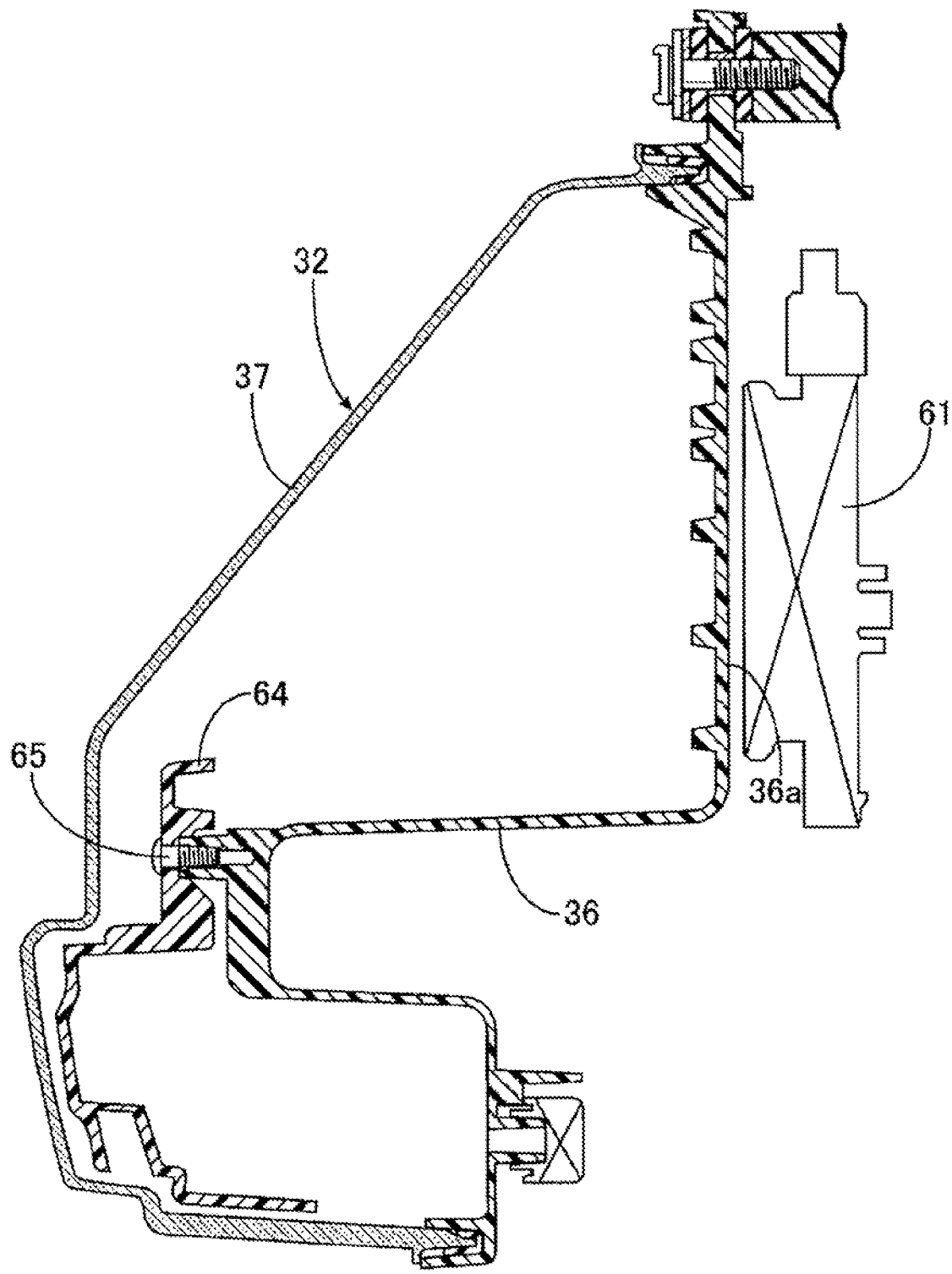
FIG. 7 is a cross sectional view taken on line 7-7 of FIG. 2.

Referring to FIG. 7 together, in the rear of a center position in the vehicle width direction of the housing 36, there is arranged a driver 61 for adjusting power supply amount to the light source 40 for the high beam headlight 34 and to the light source 46 for the low beam headlight 35.

Figure 8:
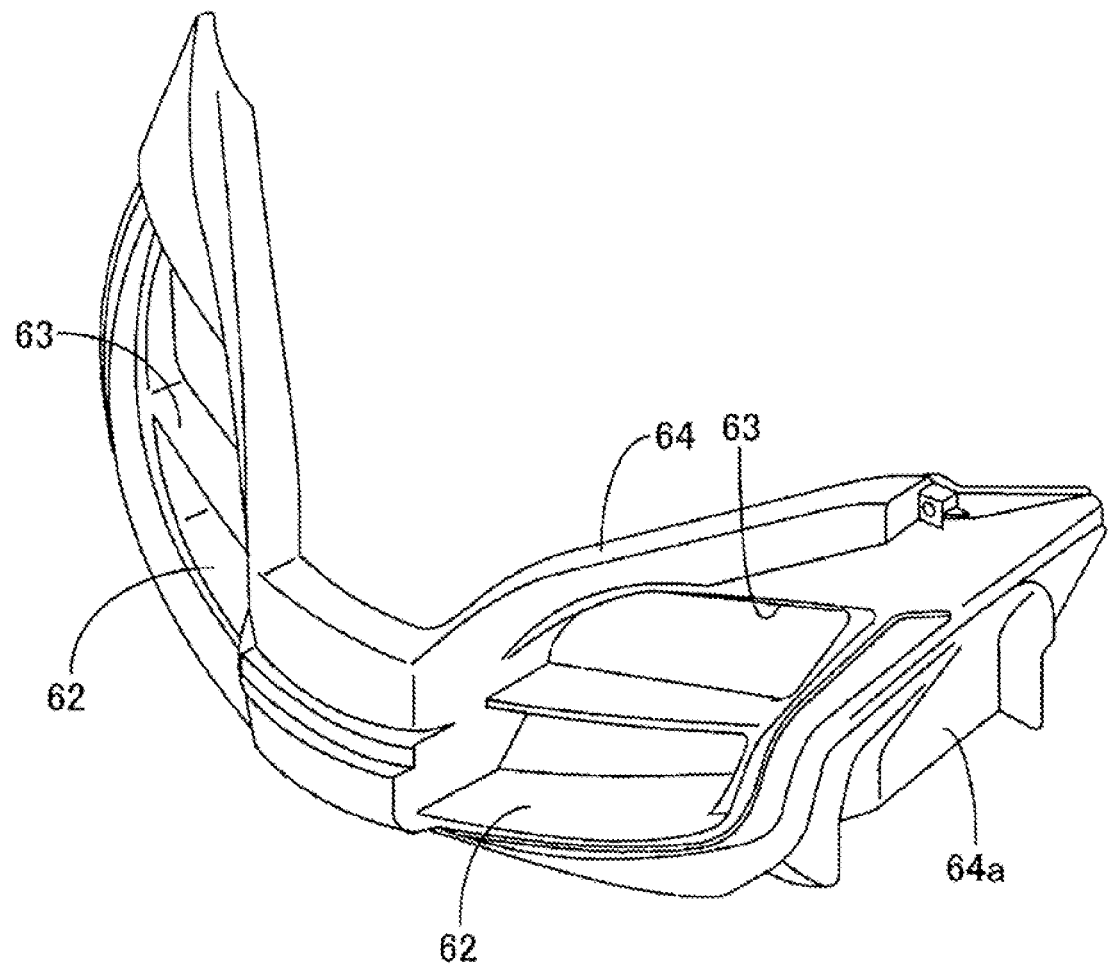
FIG. 8 is a perspective view of an extension.

Referring to FIG. 8 together, between the outer lens 37 and reflectors for the high beam headlight 34 and the low beam headlight 35 as the main light, namely, the reflector 41 for the high beam headlight 34 and the reflector 47 for the low beam headlight 35, there is arranged an extension 64 which has a pair of windows 62 for the high beam headlight 34 into which the pair of left and right high beam headlights 34 faces, and a pair of windows 63 for the low beam headlight 35 into which the pair of left and right low beam headlights 35 faces. This extension 64 is fastened to the housing 36 by a plurality of screw members 65.

Figure 9:
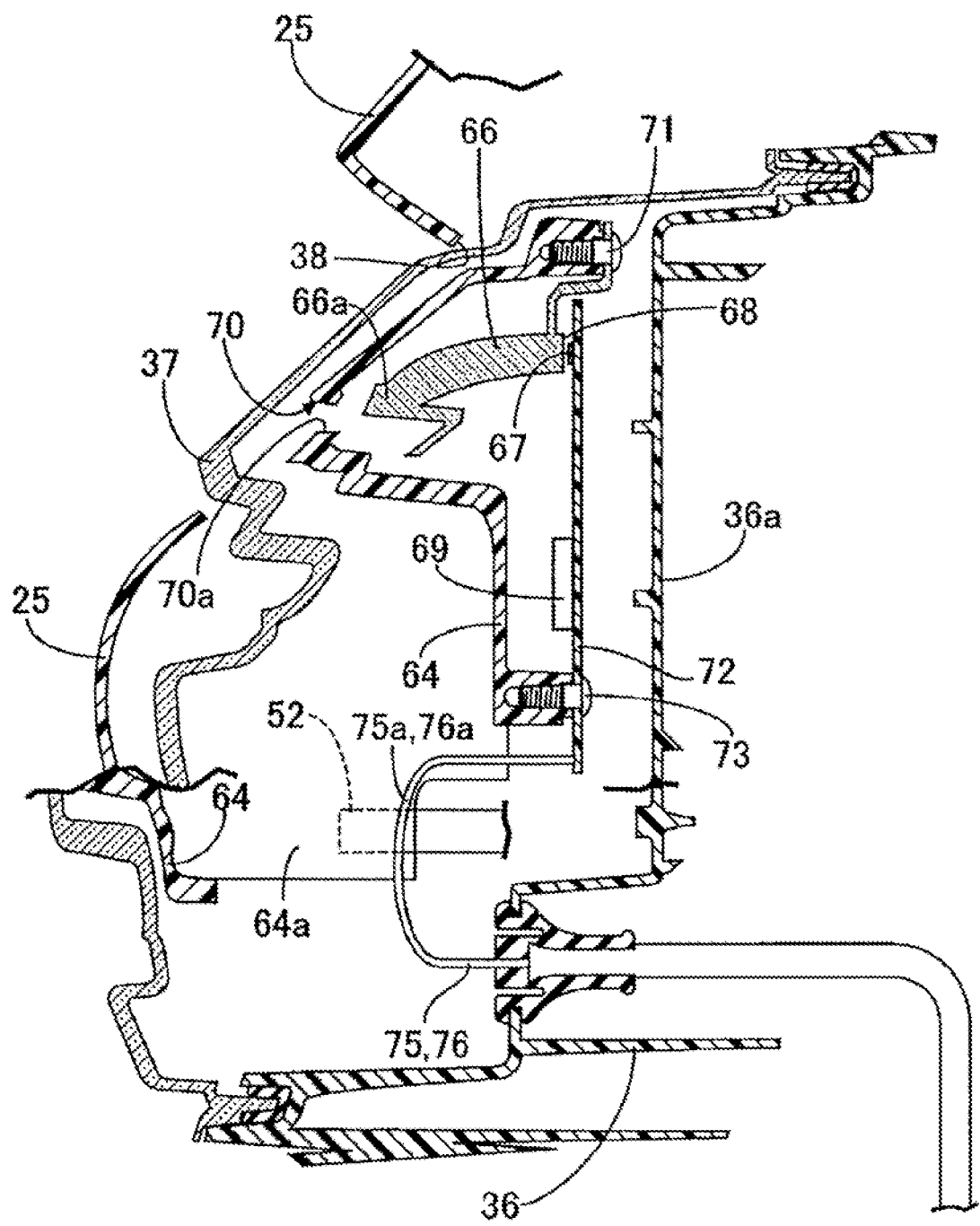
FIG. 9 is a cross sectional view taken on line 9-9 of FIG. 2.

Referring to FIG. 9 together, the headlight device 32 is provided with a pair of left and right light guide members 66 which is arranged in the vicinity of the extension 64 and a pair of left and right light sources 67 for the light guide members 66 which is provided separately from the light sources for the main lights, namely the pair of left and right light sources 40 for the high beam headlights 34 and the pair of left and right light sources 46 for the low beam headlights 35. A light incident section 68 which is provided in the light guide member 66 for admitting light from the light source 67 for the light guide member 66, and a driver 69 for the light guide member 66 which is provided for adjusting power supply amount to the light source 67 for the light guide member 66 are arranged in such a position as to be covered with the extension 64 in a front view.

The light guide member 66 extends along outer sides in the vehicle width direction of the reflector 41 for the high beam headlight 34 and the reflector 47 for the low beam headlight 35 and along a lower part of the reflector 41 for the high beam headlight 34. The light guide member 66 is configured to extend in the upward and downward direction such that an upper end of the light guide member 66 is located more outwardly in the vehicle width direction than a lower end of the light guide member 66. Moreover, the light guide member 66 is fixedly supported on the extension 64 in such a manner that a portion of the light guide member 66 faces into a slit 70 provided in the extension 64.

Namely, the light guide member 66 has a lateral straight portion 66a which extends obliquely upwardly to an outer side in the vehicle width direction on the outsides in the vehicle width direction of the reflector 41 for the high beam headlight 34 and the reflector 47 for the low beam headlight 35, and a lower straight portion 66b which extends obliquely downwardly to an inner side in the vehicle width direction from a lower end of the lateral straight portion 66a and which is arranged below the reflector 41 for the high beam headlight 34. The light guide member 66 is fastened to the extension 64 by a plurality of screw members 71. The slit 70 is configured to have a lateral straight portion 70a which allows a portion of the lateral straight portion 66a of the light guide member 66 to face thereinto and a lower straight portion 70b which allows a portion of the lower straight portion 66b of the light guide member 66 to face thereinto.

The upper end of the light guide member 66 is located above an upper end of the lateral straight portion 70a of the slit 70. The light incident section 58 is located on the side of the upper end of the light guide member 66 in such a way as to be covered with the extension 64 in a front view.

The light source 67 for the light guide member 66 is, for example, an LED and is arranged in a position in the vicinity of and in opposition to the light incident section 68. The light source 67 is fixedly supported on at least one of the extension 64 and the light guide member 66 (on the extension 64 in this embodiment).

Further, the driver 69 for the light guide member 66 is fixedly supported on at least one of the extension 64 and the light guide member 66 (on the extension 64 in this embodiment) in such a position as to be covered with the extension 64 in a front view.

The light source 67 for the light guide member 66 and the driver 69 for the light guide member 66 are provided in a common base plate 72. The base plate 72 is fixedly supported on at least one of the extension 64 and the light guide member 66. In this embodiment, the base plate 72 is fastened to the extension 64 by a screw member 73.

The base plate 72 is formed in a vertically extending shape and arranged on the outside in the vehicle width direction of the high beam headlight 34 and the low beam headlight 35 serving as the main light. The light source 67 for the light guide member 66 and the driver 69 for the light guide member 66 are attached to the base plate 72 in a state of being aligned with each other in the upward and downward direction. Namely, the driver 69 for the light guide member 66 is provided on the base plate 72 in such a way as to be located below the light source 67 for the light guide member 66 which is located in an upper end portion of the base plate 72.

A pair of lead wires 75, 76 for supplying electric power to the driver 69 for the light guide member 66 is led into the housing 36 from the back wall 36a of the housing 36. These lead wires 75, 76 are formed with curved portions 75a, 76a bulging forwardly in front of the back wall 36a and are connected to the base plate 72. In addition, a regulation plate section 64a is provided at an outer end portion in the vehicle width direction of the extension 64 so as to regulate inward displacement in the vehicle width direction of the curved portions 75a, 76a, within the housing 36.

By the way, the curved portions 75a, 76a, and the support spindle 52 serving as an adjustment support section which allows the reflector 41 for the high beam headlight 34 and the reflector 47 for the low beam headlight 35 to be supported in the housing 36 in such a manner as to make it possible to adjust the optical axes of the high beam headlight 34 and the low beam headlight 35, as clearly shown in FIG. 2, are arranged side by side in the vehicle width direction and in close vicinity to each other. The regulation plate section 64a is located between each of the curved portions 75a, 76a and the support spindle 52 in the vehicle width direction.

Next, the operation of this embodiment will be explained. The headlight device 32 is provided with the light sources 67 for the light guide members 66 which are provided separately from the light sources 40 for the light sources 40 for the high beam headlights 34 and the light sources 46 for the low beam headlights 35. The light incident section 68 which is provided in the light guide member 66 for admitting the light from the light source 67 for the light guide member 66, and the driver 69 for the light guide member 66 which is provided for adjusting the power supply amount to the light source 67 for the light guide member 66 are arranged in such a position as to be covered with the extension 64 in a front view. With this construction, the light incident section 68 and the driver 69 for the light guide member 66 can be arranged effectively without injuring the external appearance.

Further, since the light guide member 66 is fixedly supported on the extension 64 and the light source 67 for the light guide member 66 is fixedly attached to at least one (the extension 64 in this embodiment) of the extension 64 and the light guide member 66, the irregularity in the relative position between the light incident section 68 and the light guide member 66 can be controlled.

Further, since the driver 69 for the light guide member 66 is fixedly supported on at least one (the extension 64 in this embodiment) of the extension 64 and the light guide member 66 in such a position as to be covered with the extension 64 in a front view, the property of external appearance can be increased in such a manner that the driver 69 for the light guide member 66 is invisible from outside.

Further, since the light source 67 for the light guide member 66 and the driver 69 for the light guide member 66 are provided on the common base plate 72 and the base plate 72 is fixedly supported on at least one (the extension 64 in this embodiment) of the extension 64 and the light guide member 66, the light source 67 for the light guide member 66 and the driver 69 for the light guide member 66 can be assembled without increasing component parts, thereby permitting cost reduction. In addition, it is possible to simplify the assembling of the light source 67 for the light guide member 66 and the driver 69 for the light guide member 66.

Further, the base plate 72 which is configured to extend vertically, is arranged on the outside in the vehicle width direction of the high beam headlight 34 and the low beam headlight 35, and the light source 67 of the light guide member 66 and the driver 69 for the light guide member 66 are attached to the base plate 72 in a state of being aligned with each other in the upward and downward direction. Therefore, the width of the base plate 72 in the vehicle width direction can be decreased, so that the width of the headlight device 32 can be decreased.

Further, the light guide member 66 is configured to extend in the upward and downward direction such that the upper end of the light guide member 66 is arranged more outwardly in the vehicle width direction than the lower end thereof, and the light incident section 68 is located on the side of the upper end of the light guide member 66 while the driver 69 for the light guide member 66 is located below the light source 67 for the light guide member 66. Therefore, the light source 67 for the light guide member 66 and the driver 69 for the light guide member 66 can be easily arranged on the base plate 72.

Further, the lead wires 75, 76 for supplying the electric power to the driver 69 for the light guide member 66 are led into the housing 36 from the back wall 36a of the housing 36 so as to be connected to the base plates 72, and are formed with the curved portions 75a, 76a bulging forwardly in front of the back wall 36a. In addition, the regulation plate section 64a is provided at the outer end portion in the vehicle width direction of the extension 64 so as to regulate the inward displacement in the vehicle width direction of the curved portions 75a, 76a, within the housing 36, Therefore, the lead wires 75, 76 have enough length, so that when at least one of the extension 64 and the light guide member 66 on which the base plate 72 is attached is assembled into the housing 36, the assembling operation can be easily performed. Moreover, since the regulation plate section 64a provided at the outer end portion in the vehicle width direction of the extension 64 is configured to regulate the inward displacement in the vehicle width direction of the curved portions 75a, 76a, within the housing 36, it is possible to control the inward displacement of the lead wires 75, 76 in the vehicle width direction.

Further, the curved portions 75a, 76a, and the support spindle 52 which allows the reflector 41 for the high beam headlight 34 and the reflector 47 for the low beam headlight 35 to be supported in the housing 36 in such a manner as to make it possible to adjust the optical axes of the high beam headlight 34 and the low beam headlight 35, are arranged side by side in the vehicle width direction and in close vicinity to each other. The regulation plate section 64a is located between each of the curved portions 75a, 76a and the support spindle 52 in the vehicle width direction. Therefore, the interference between the support spindle 52 and the curved portions 75a, 76a is prevented, and the support spindle 52 is arranged as outwardly in the vehicle width direction as possible, so that the reflector 41 for the high beam headlight 34 and the reflector 47 for the low beam headlight 35 can be supported in a stable fashion.

Figure 10:
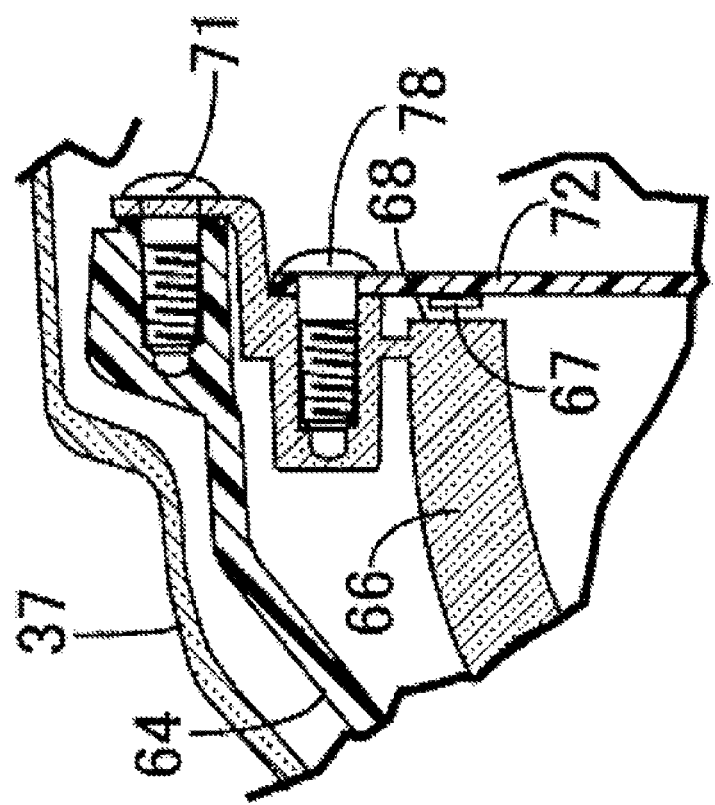
FIG. 10 is a cross sectional view of a part corresponding to an essential part of FIG. 9, in accordance with a second embodiment.

In accordance with the second embodiment as shown in FIG. 10, the base plate 72 on which the light source 67 for the light guide member 66 and the driver 69 for the light guide member 66 are provided may be fastened through a screw member 78 and fixedly supported on the light guide member 66 fixed on the extension 64.

Furthermore, the base plate 72 may be fixedly supported by both the extension 64 and the light guide member 66.

While preferred embodiments have been described, the present invention is not limited to the above described embodiments, and various changes and modifications may be made without departing from the scope as defined in the appended claims.

We claim:

1. A lighting system for a vehicle, comprising:
   a main light comprising a light source and a reflector,
   an extension member disposed between said reflector for said main light and an outer lens,
   a light guide member disposed in the vicinity of said extension member, said light guide member including a light incident section for admitting light,
   a light source for said light guide member, provided separately from the light source of said main light, said light source emitting light which is admitted into said light guide member by said light incident section,
   a driver for said light guide member, which adjusts a power supply amount to said light source for said light guide member,
   wherein said light incident section of said light guide member and said driver for the light guide member are positioned so as to be covered by said extension member, in a front view,
   wherein said light source for said light guide member is positioned so as to be covered by said extension member, in the front view, and
   wherein said light source for said light guide member is disposed at a position which is behind at least a portion of said light guide member in a vehicle front-rear direction and which is within a vertical height of said light guide member.

2. The lighting system according to claim 1,
   wherein said light guide member is attached to said extension member, and
   wherein said light source for said light guide member is attached to at least one of said extension member and said light guide member.

3. The lighting system according to claim 2,
   wherein said driver for said light guide member is supported on at least one of said extension member and said light guide member so as to be covered by said extension member, in a front view.

4. The lighting system according to claim 3,
wherein said light source for said light guide member and said driver for said light guide member are provided on a common base plate, and
wherein said base plate is supported on at least one of said extension member and said light guide member.

5. The lighting system according to claim 4,
wherein said base plate extends vertically, and is disposed on an outer side of said main light, in the vehicle width direction, and
wherein said light source for said light guide member and said driver for said light guide member are attached to said base plate and are aligned with each other in the upward and downward direction.

6. The lighting system according to claim 5,
wherein said light guide member extends in the upward and downward direction such that an upper end of said light guide member is disposed more outwardly than a lower end of said light guide member, in the vehicle width direction,
wherein said light incident section is located on a side of an upper end of said light guide member, and
wherein said driver for said light guide member is disposed below said light source for said light guide member.

7. The lighting system according to claim 6, further comprising a lead wire led into a housing from a back wall of said housing and supplying electric power to said driver for said light guide member,
wherein said lead wire includes a curved portion bulging forwardly, in front of said back wall, and is connected to said base plate, and
wherein a regulation plate section is provided at an outer end portion of said extension member, in the vehicle width direction, so as to regulate inward displacement of said curved portion within said housing, in the vehicle width direction.

8. The lighting system according to claim 7, further comprising an adjustment support section which supports said reflector in said housing such that an optical axis of said main light is adjustable,
wherein said curved portion and said adjustment support section are disposed side-by-side, in the vehicle width direction, and
wherein said regulation plate section is located between said curved portion and said adjustment support section, in the vehicle width direction.

9. The lighting system according to claim 5, further comprising a lead wire led into a housing from a back wall of said housing and supplying electric power to said driver for said light guide member,
wherein said lead wire includes a curved portion bulging forwardly, in front of said back wall, and is connected to said base plate, and
wherein a regulation plate section is provided at an outer end portion of said extension member, in the vehicle width direction, so as to regulate inward displacement of said curved portion within said housing, in the vehicle width direction.

10. The lighting system according to claim 9, further comprising an adjustment support section which supports said reflector in said housing such that an optical axis of said main light is adjustable,
wherein said curved portion and said adjustment support section are disposed side-by-side, in the vehicle width direction, and
wherein said regulation plate section is located between said curved portion and said adjustment support section, in the vehicle width direction.

11. The lighting system according to claim 4, further comprising a lead wire led into a housing from a back wall of said housing, and supplying electric power to said driver for said light guide member,
wherein said lead wire includes a curved portion bulging forwardly, in front of said back wall, and is connected to said base plate, and
wherein a regulation plate section is provided at an outer end portion of said extension member, in the vehicle width direction, so as to regulate inward displacement of said curved portion within said housing, in the vehicle width direction.

12. The lighting system according to claim 11, further comprising an adjustment support section which supports said reflector in said housing such that an optical axis of said main light is adjustable,
wherein said curved portion and said adjustment support section are disposed side-by-side, in the vehicle width direction, and
wherein said regulation plate section is located between said curved portion and said adjustment support section, in the vehicle width direction.

13. A lighting system for a vehicle, comprising:
a main light comprising a light source and a reflector,
an extension member disposed between said reflector for said main light and an outer lens,
a light guide member disposed in the vicinity of said extension member, said light guide member including a light incident section for admitting light,
a light source for said light guide member, provided separately from the light source of said main light, said light source emitting light which is admitted into said light guide member by said light incident section,
a driver for said light guide member, which adjusts a power supply amount to said light source for said light guide member,
wherein said light incident section of said light guide member and said driver for the light guide member are positioned so as to be covered by said extension member, in a front view,
wherein said light guide member is attached to said extension member,
wherein said light source for said light guide member is attached to at least one of said extension member and said light guide member,
wherein said light source for said light guide member and said driver for said light guide member are provided on a common base plate,
wherein said base plate is supported on at least one of said extension member and said light guide member,
wherein the lighting system further comprises a lead wire led into a housing from a back wall of said housing, and supplying electric power to said driver for said light guide member,
wherein said lead wire includes a curved portion bulging forwardly, in front of said back wall, and is connected to said base plate,
wherein a regulation plate section is provided at an outer end portion of said extension member, in a vehicle width direction, so as to regulate inward displacement of said curved portion within said housing, in the vehicle width direction, wherein the lighting system further comprises an adjustment support section which supports said reflector in said housing such that an optical axis of said main light is adjustable, wherein said curved portion and said adjustment support section are disposed side-by-side, in the vehicle width direction, wherein said regulation plate section is located between said curved portion and said adjustment support section, in the vehicle width direction, wherein said light source for said light guide member is positioned so as to be covered by said extension member, in the front view, and wherein said light source for said light guide member is disposed at a position which is behind at least a portion of said light guide member in a vehicle front-rear direction and which is within a vertical height of said light guide member.

14. The lighting system according to claim 13, wherein said driver for said light guide member is supported on at least one of said extension member and said light guide member so as to be covered by said extension member, in a front view.

15. The lighting system according to claim 13, wherein said base plate extends vertically, and is disposed on an outer side of said main light, in the vehicle width direction, and wherein said light source for said light guide member and said driver for said light guide member are attached to said base plate and are aligned with each other in the upward and downward direction.

16. The lighting system according to claim 13, wherein said light guide member extends in the upward and downward direction such that an upper end of said light guide member is disposed more outwardly than a lower end of said light guide member, in the vehicle width direction, wherein said light incident section is located on a side of an upper end of said light guide member, and wherein said driver for said light guide member is disposed below said light source for said light guide member.

* * * * *